(12) United States Patent
Smith

(10) Patent No.: US 11,604,550 B1
(45) Date of Patent: Mar. 14, 2023

(54) SIMULTANEOUS USE OF A CAPACITANCE-BASED TRACK PAD

(71) Applicant: Cirque Corporation, Sandy, UT (US)

(72) Inventor: Tyler Smith, American Fork, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 17/407,285

(22) Filed: Aug. 20, 2021

(51) Int. Cl.
*G06F 3/041* (2006.01)
*G06F 3/044* (2006.01)

(52) U.S. Cl.
CPC .......... *G06F 3/0445* (2019.05); *G06F 3/0446* (2019.05)

(58) Field of Classification Search
CPC ...... G06F 3/0445; G06F 3/0446; G06F 1/169; G06F 3/03547; G06F 3/041; G06F 2203/0338
USPC .................................................. 345/173, 168
See application file for complete search history.

(56) References Cited

U.S. PATENT DOCUMENTS

| | | | |
|---|---|---|---|
| 7,274,353 B2 | 9/2007 | Chiu | |
| 8,754,854 B1 | 6/2014 | Hamburgen | |
| 2010/0289759 A1* | 11/2010 | Fisher | G06F 3/04166 345/173 |
| 2017/0255319 A1* | 9/2017 | Winebrand | G06F 3/03545 |

* cited by examiner

*Primary Examiner* — Deeprose Subedi

(57) ABSTRACT

An apparatus may include a capacitance-based trackpad, a tracking driver in communication with the capacitance-based trackpad, a key driver in communication with the capacitance-based trackpad, a processor, and a memory having programmed instructions that, when executed, may cause the processor to modify the raw track inputs to associate a non-confidence indicator with at least one raw track input from the track inputs to form processed track inputs, send the processed track inputs to the tracking driver, and send the processed track inputs to the key driver. The tracking driver may be configured to receive raw track inputs from the capacitive-based trackpad and the key driver may be configured to receive raw key inputs from the capacitance-based trackpad.

20 Claims, 15 Drawing Sheets

SIMULTANEOUS USE OF A CAPACITANCE-BASED TRACK PAD

FIELD OF THE DISCLOSURE

This disclosure relates generally to systems and methods for use of a capacitance-based track pad. In particular, this disclosure relates to systems and methods for simultaneous use of key and track commands on at least one multi-use region of a capacitance-based track pad.

BACKGROUND

The present invention relates to input devices, such as input devices that are integrated into computing devices or input devices that are peripheral devices that can communicate with computing devices. Often, computing devices incorporate a capacitance-based track pad that has an overlay and an arrangement of sense electrodes located under the overlay. Capacitance-based track pads are often used in numerous consumer electronic goods such as laptops, cellular phones, vehicles, and the like. Some track pads include areas that can be selectively used as keys or for other purposes to expand the use of the track pad.

A track pad with buttons incorporated as keys can allow for broadened use of the track pad area. In many cases, track pads are used for navigation commands in additional to other commands activated by motions or gestures on the surface of the track pad, with examples such as scrolling, scaling, tapping, and the like. Some track pads with incorporated keys on the trackpad surface are mechanical buttons, similar to those used in a traditional keyboard where the keys have a switch. Commercially available track pads often process just one function at a time.

An example of a track pad is disclosed in U.S. Pat. No. 7,274,353 B2 issued to Yen-chang Chiu, et al. This reference discloses a capacitive touchpad integrated with key and handwriting functions is provided for operation in key, handwriting and mouse modes. Several regions are defined on the panel of the touchpad and have several patterns printed thereon for the operation modes thereby. In the key mode, the key patterns among the printed patterns simulate a keyboard. In the handwriting mode, the handwriting region among the defined regions serves to handwriting input. In the mouse mode, the defined regions provide a cursor moving region and a horizontal and vertical scroll bars for input operations.

Another example of a track pad is disclosed in U.S. Pat. No. 8,754,854 issued to William Hamburgen, et al. This reference discloses an apparatus includes a processor and a keyboard having multiple, separately moveable keys. The keyboard is configured to function as both a keyboard and a trackpad. Both of these references are herein incorporated by reference for all that they disclose.

SUMMARY

In some embodiments, an apparatus may include a capacitance-based trackpad, a tracking driver in communication with the capacitance-based trackpad, a key driver in communication with the capacitance-based trackpad, a processor, and a memory having programmed instructions that, when executed, may cause the processor to modify the raw track inputs to associate a non-confidence indicator with at least one raw track input from the track inputs to form processed track inputs, send the processed track inputs to the tracking driver, and send the processed track inputs to the key driver. The tracking driver may be configured to receive raw track inputs from the capacitive-based trackpad and the key driver may be configured to receive raw key inputs from the capacitance-based trackpad.

The capacitance-based track pad may include a multi-use region that is selectively configured to operate in a track specific mode and selectively configured to operate, when activated, in a key mode, and when the key mode is activated, the multi-use region is configured to receive raw track inputs and raw key inputs from a user.

The capacitance-based trackpad may have an overlay, wherein the overlay exhibits a characteristic that allows for at least some electric field to pass through a thickness of the overlay.

The overlay may include a key area associated with the multi-use region that exhibits a characteristic of allowing light to pass through the key area to illuminate the key area when the key mode is activated.

The programmed instructions, when executed, may cause the processor to selectively activate the key mode based off a receipt of a command.

The command may be from a programmed application interacting with the apparatus.

The programmed instructions may cause the processor, when executed, to package the raw track inputs and the raw key inputs as a processed package with the non-confidence indicators when the key mode is activated.

The sending of the raw track inputs and the raw key inputs to the tracking driver may include sending the processed package to the tracking driver when the key mode is activated.

The sending of the raw track inputs and the raw key inputs to the tracking driver may include sending the processed package to the key driver when the key mode is activated.

The programmed instructions, when executed, may cause the processor to simultaneously operate the track mode in the multi-use region when the key mode is activated.

The modifying the raw track inputs to associate a non-confidence indicator with at least one raw track input may include associating the non-confidence indicator with tapping track inputs received in the multi-use region when key mode is activated.

The programmed instructions, when executed, may cause the processor to associate a confidence indicator with scaling track inputs received in the multi-use region when key mode is activated.

The programmed instructions, when executed, may cause the processor to associate a confidence indicator with sliding track inputs received in the multi-use region when key mode is activated.

A method of using a capacitance-based track pad may include modifying at least one raw track input made to the capacitance-based trackpad to associate a non-confidence indicator with the at least one raw track input form processed track inputs, sending the processed track inputs to the track driver, and sending the processed track inputs to the key driver.

The capacitance-based track pad may include a multi-use region that is selectively configured to operate in a track specific mode and selectively configured to operate, when activated, in a key mode, and when the key mode is activated, the multi-use region is configured to receive raw track inputs and raw key inputs from a user.

The modifying of at least one raw track input made to the capacitance-based trackpad to associate a non-confidence indicator with the at least one raw track input may include associating the non-confidence indicator with tapping track raw inputs received in the multi-use region when key mode is activated.

The modifying at least one raw track input made to the capacitance-based trackpad may include associating a confidence indicator with scaling track inputs received in the multi-use region when key mode is activated.

The modifying at least one raw track input made to the capacitance-based trackpad may include associating a confidence indicator with sliding track inputs received in the multi-use region when key mode is activated.

In some embodiments, a computer-program product for using a capacitance sensor, the computer-program product, which may include a non-transitory computer-readable medium storing instructions executable by a processor, may modify at least one raw track input made to the capacitance-based trackpad to associate a non-confidence indicator with the at least one raw track input to form processed track inputs, send the processed track inputs to the track driver and send the processed track inputs to the key driver.

The programmed instructions, when executed, may cause the processor to associate the non-confidence indicator with tapping track inputs received in the multi-use region when key mode is activated, associate a confidence indicator with scaling track inputs received in the multi-use region when key mode is activated, and associate a confidence indicator with sliding track inputs received in the multi-use region when key mode is activated.

Figure 1:
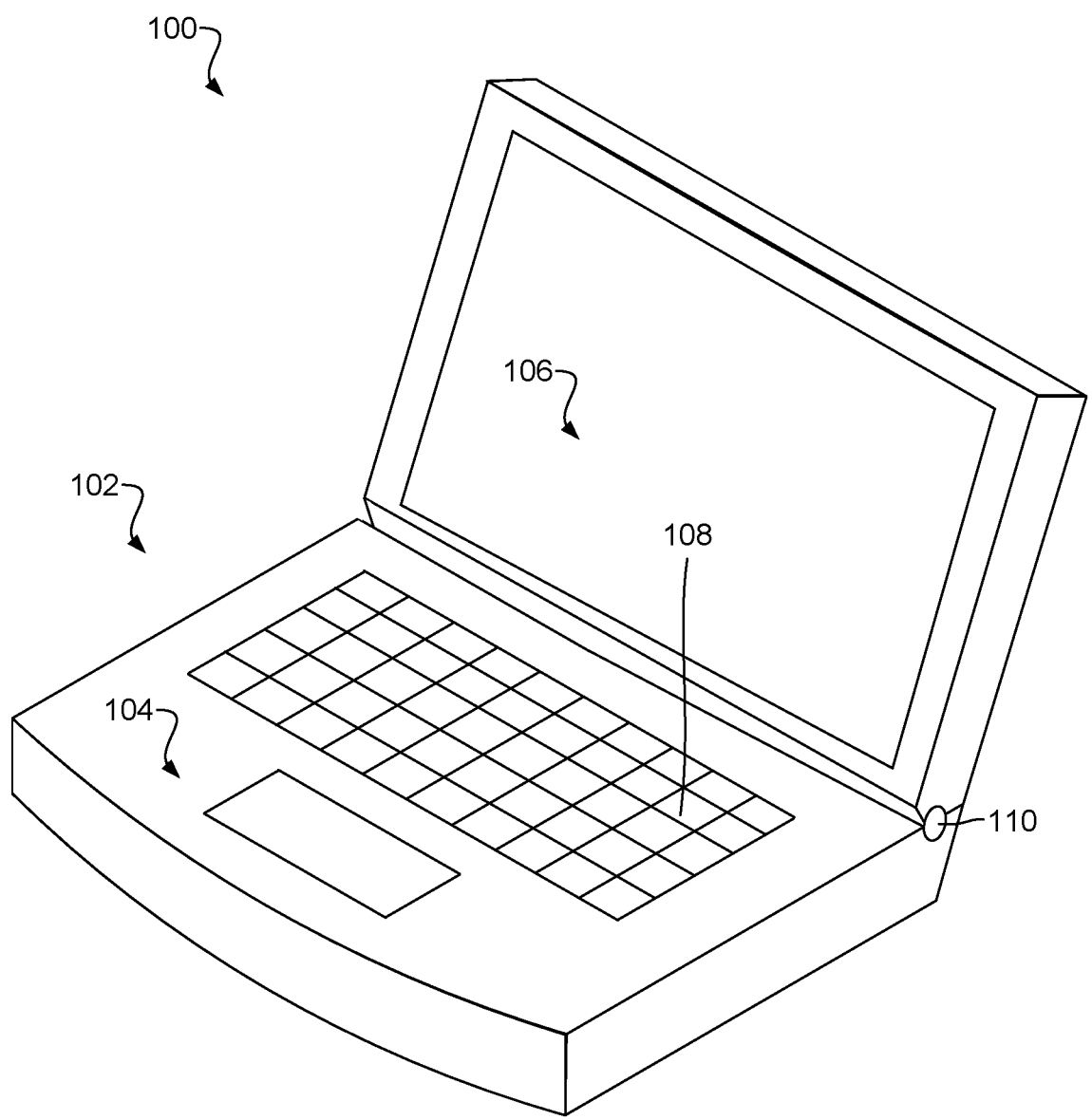
FIG. 1 depicts an example of an electronic device in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "capacitance-based trackpad" may generally refer to a device that measures capacitance values changed by the presence of an electrically conductive object within the proximity of the capacitance-based track pad. For purposes of this disclosure, the term "raw inputs" may generally refer to unprocessed, capacitive data measured by the track pad. In some cases, at least some of the raw data may be packaged and sent to an appropriate driver for interpretation. For the purposes of this disclosure "processed data" may generally refer to data that is processed before being sent to an appropriate driver for interpretation. In some cases, processed data may include, but is not limited to, filtered data, data with non-confidence indicators inserted therein, data with confidence indicators inserted therein, data with deleted portions, data with insertions incorporated therein, data with other modifications, or combinations thereof. In some cases, processed data is packaged and sent to an appropriate driver for interpretation.

For purposes of this disclosure, the term "driver" may refer software, firmware, and hardware collectively used to interpret the intended commands measured with the capacitive-based track pad. In some cases, the driver may be in communication with portions of the computing device which are responsible for executing the commands associated with the user's inputs. For purposes of this disclosure, the term "track driver" may generally refer to a driver that interprets the track inputs measured by the capacitance-based track pad, such as sliding, scaling, scrolling, and tapping and other types of tracking gestures. For purposes of this disclosure, the term "key driver" may generally refer to a driver that interprets the key inputs measured in a key area of the capacitance-based track pad.

For purposes of this disclosure, the term "track input" may generally refer to an input given by the user that is reflective of gestures moving across at least a portion of the trackpad. In some cases, some of the "track" inputs may be referred to as "slide," "swipe" and "drag" inputs. For purposes of this disclosure, the term "key input" may generally refer to an input given by the user or an object that is associated with selecting a key area located on the overlay of the capacitance-based track pad.

It should be understood that use of the term "capacitive-based track pad" throughout this document may be used interchangeably with "capacitive touch sensor," "capacitive sensor," "capacitive touch and proximity sensor," "proximity sensor," "touch and proximity sensor," "touch panel," "trackpad", "touch pad," "touch sensor," and "touch screen."

For the purposes of this disclosure, the term "overlay" may generally refer to a tangible material that is generally transparent or semi-transparent to electrical fields. The overlay may be made out of any appropriate material that has an appropriate transparency to allow changes in capacitance to be detected with a capacitance sensor when the overlay is positioned between the capacitance sensor and the object that is affecting the change in capacitance. Often, the overlay may include a touch surface or track surface that a user can touch with his or her finger or another type of object that can be used as a tactile feedback for providing input to the capacitance sensor. However, proximity away from the capacitance sensor, rather than actually touching the touch surface, may be used as the input by the controller to interpret the user's input. In some cases, the overlay is incorporated into a display screen, a track pad assembly, a kiosk, a touch panel, a mobile device, another type of device, or combinations thereof.

For the purposes of the disclosure, the term "key area" may generally refer to a region on the overlay wherein the raw key inputs are inputted. This region may be selectively caused to operate as a key area during a key mode, but operate with different functionality when a different mode is applied. The key mode may be caused to be selectively activated and/or selectively deactivated based on a command from a user, software, a networked device, another type of device, or combinations thereof. For the purposes of this disclosure, the term "key mode" may generally refer to the mode that causes the key area to be activated. Examples of "key inputs" may include, but is not limited to "tapping inputs." For the purposes of the disclosure, the term "multi-use region" may generally refer to a region on the capacitance-based sensor that is selectively designated for key inputs, but has the ability to be selectively designated for other modes, such as a tracking mode. The capacitance-based sensor may be located adjacent to the overlay. In some cases, the multi-use region is that portion of the sensor that is capable of operating in more than one mode. In such an example, the key area on the overlay may physically overlap with the multi-use region of the sensor. Thus, in some cases, an input to the key area during a key mode may be interpreted to be a key input and an input to the key area during the tracking mode may be interpreted to be a tracking input. However, in some cases, during the key mode and depending on the type of input, an input to the key area may be determined to be either a tracking input or a key input. In some cases, during a tracking mode, only tracking inputs may be determined.

For purposes of this disclosure the term "tapping raw inputs" may generally refer to a finger tap on the surface of the overlay. In some examples, a tapping raw input may have a similar timing to that of a single key press on a traditional keyboard. For purposes of this disclosure, the term "raw track inputs" may generally refer to gestures involving a translation from a user's position or motion on the track pad to a relative position depicted on a screen. For purposes of this disclosure, the term "scaling raw inputs" may generally refer to gestures involving changing a scale of an image depicted on a screen associated with the track pad. In some examples, the scaling input may be recognized with a finger gesture on the surface of the overlay that involves two fingers moving with respect to each other. In some cases, the fingers may either move away from each other or move towards each other to communicate a command to change the scale. In some cases, the scaling input may be described as a "pinch" or "zoom" gesture. For purposes of this disclosure the term "sliding raw inputs" may generally refer to a finger gesture where a finger placed on the overlay begins in one region of the overlay and changes coordinates on the overlay from that starting position over a period of time. In some cases, a "sliding raw input" may be referred to as a "swipe" or "glide" gesture.

For the purposes of the disclosure, the term "non-confidence indicator" may generally refer to a piece of electronic information attached to the processed track input to be sent to the track driver or the key driver when a raw track input does not match certain features of an input above a predetermined level of confidence. In some cases, the "non-confidence indicator" may refer to any piece of information inserted into a processed data that instructs at least one driver not to process a particular string of data. For example, a non-confidence indicator may be added to a tapping input so that the tracking driver does not process the tapping input. However, in such an example, the non-confidence indicator may not be read by the key driver. In such a case, only the key driver may interpret the tapping input. In this situation, only one of the track drivers and the key drivers interprets a particular input. In some cases, the non-confidence indicator is added to data that is intended to be sent to both the key driver and the track driver. However, in some cases, the non-confidence indicator is only added to track driver, the key driver, another driver, or combinations thereof.

For the purposes of the disclosure, the term "confidence indicator" may generally refer to a piece of electronic information that is attachable to the processed track input to be sent to the track driver or the key driver when the sensor recognizes a track input that meets the expected characteristics of an input above a predetermined level of confidence.

A processor may be used to make modifications to the data gathered by the track pad. Modifications to raw track inputs and raw key inputs, for the purpose of this disclosure, are generally referred to as a "processed track input" and a "processed key input." The processed track input and processed key input may be received by the track driver and/or key driver.

FIG. 1 depicts an example of a portable electronic device 100. In this example, the portable electronic device is a laptop. In the illustrated example, the portable electronic device 100 includes input components, such as a keyboard 102 and a touch pad 104. The portable electronic device 100 also includes a display 106. A program operated by the portable electronic device 100 may be depicted in the display 106 and controlled by a sequence of instructions that are provided by the user through the keyboard 102 and/or through the touch pad 104. An internal battery (not shown) may be used to power the operations of the portable electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to add different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 may include a capacitance sensor disposed underneath a surface containing the keyboard 102. In some examples, the touch pad 104 is located in an area of the keyboard's surface where the user's palms may rest while typing. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured between the electrodes on the different layers. However, as the user's finger or other electrically conductive objects approach the electrodes, the capacitance may change. These capacitance changes and their associated locations may be quantified to determine where the user is touching or hovering his or her finger within the area of the touch pad 104. In some examples, the first set of electrodes and the second set of electrodes are equidistantly spaced with respect to each other. Thus, in these examples, the sensitivity of the touch pad 104 is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may include a capacitance sensor that is located behind an outside surface of the display 106. As a user's finger or other electrically conductive object approaches the touch sensitive screen, the capacitance sensor may detect a change in capacitance as an input from the user.

Figure 2:
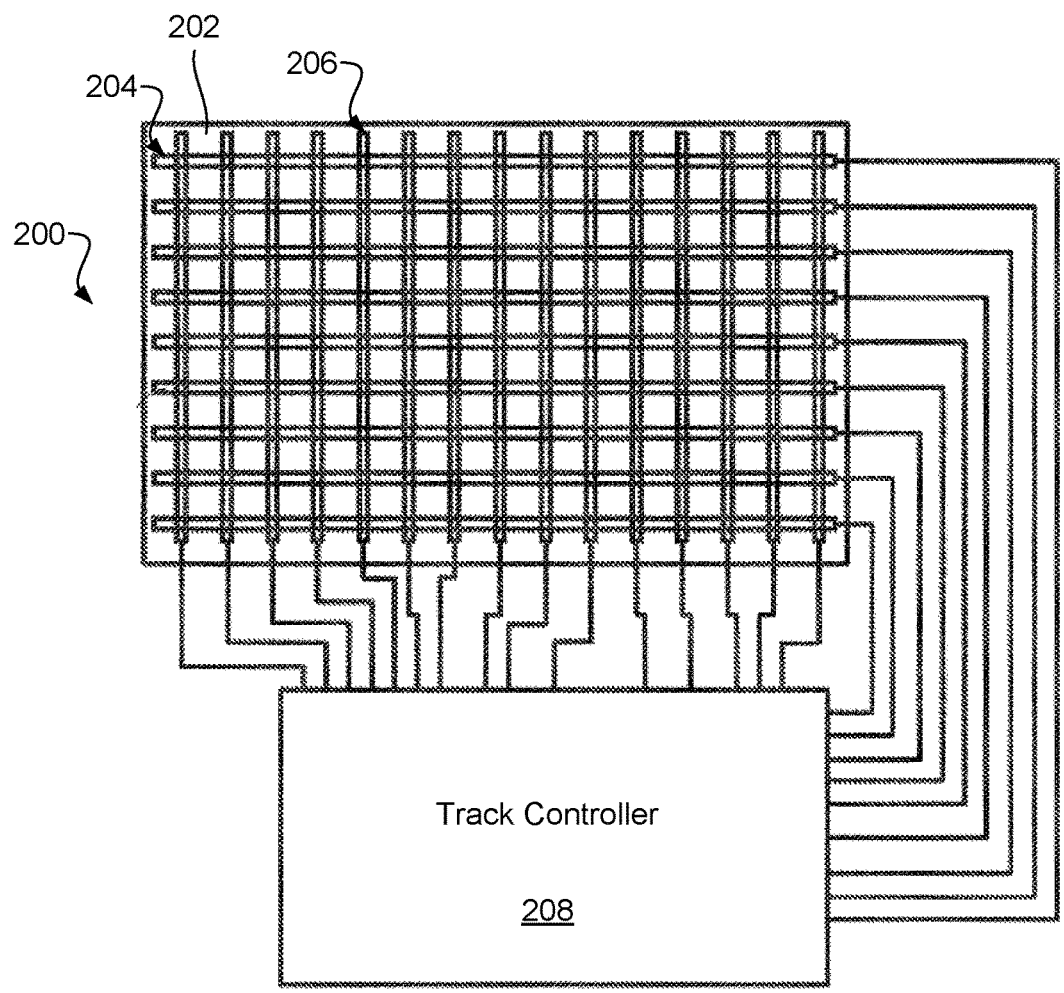
FIG. 2 depicts an example of a substrate with a first set of electrodes and a second set of electrodes in accordance with the present disclosure.

FIG. 2 depicts an example of a portion of a touch input component 200. In this example, the touch input component 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. Where electrodes from the first set 204 overlap with electrodes from the second set 206, capacitance can be measured. The touch input component 200 may include one or more electrodes in the first set 204 or the second set 206. Such a substrate 202 and electrode sets may be incorporated into a touch screen, a touch pad, and/or swell detection circuitry incorporated into a battery assembly.

In some examples, the touch input component 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the touch input controller 208 includes a touch controller 208. The touch controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the touch controller 208 includes at least one multiplexing circuit to alternate which of the sets 204, 206 of electrodes are operating as drive electrodes and sense electrodes. The driving electrodes can be driven one at a time in sequence, or randomly, or multiple at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A ground plane shield (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the touch input component 200. The touch input component 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the touch input component 200, the touch controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in an alternative example, the absolute capacitance value may be measured.

While this example has been described with the touch input component 200 having the flexibility of the switching the sets 204, 206 of electrodes between sense and transmit electrodes, in other examples, each set of electrodes is dedicated to either a transmit function or a sense function.

While the example of FIG. 2 describes a mutual capacitance arrangement for measuring changes in capacitance, in other examples, the system may include a self-capacitance arrangement for measuring changes in capacitance. Such an arrangement may include a single set of electrodes that transmits a drive signal. Then using the same set of electrodes that previously transmitted the drive signal, sensing changes in capacitance.

Figure 3:
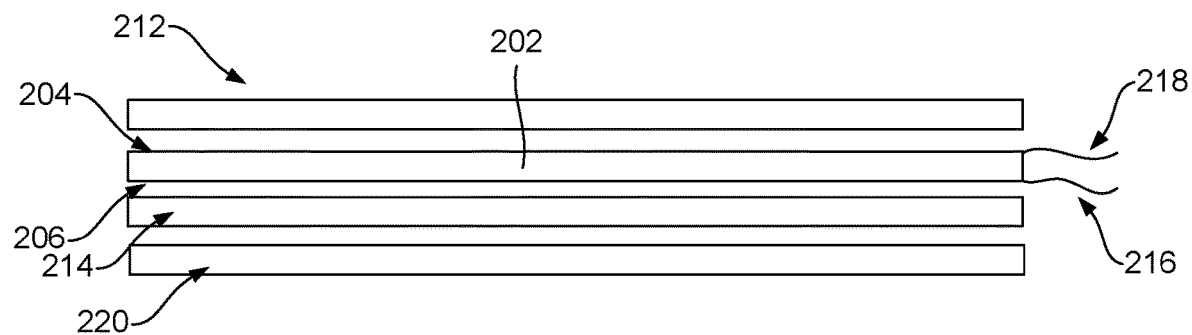
FIG. 3 depicts an example of a track pad in accordance with the present disclosure.

FIG. 3 depicts an example of a substrate 202 with a first set 204 of electrodes and a second set 206 of electrodes deposited on the substrate 202 that is incorporated into a touch pad. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202. The second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap or come into close enough proximity to each other. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In examples that use self-capacitance to measure changes in capacitance, a single set of electrodes may be deposited on the substrate. In such an example, the single set of electrodes may both transmit the drive signal and sense the changes in capacitance.

FIG. 3 depicts a cross section of a touch pad, and the substrate 202 may be located between a touch surface 212 and a shield 214. The touch surface 212 may be a covering that is placed over the first side of the substrate 202 and that is at least partially transparent to electric fields. As a user's finger or stylus approach the touch surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the portable electronic device. This shield may prevent influence on the electric fields on the substrate 202.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

In the example depicted in FIG. 3, the shield 214 may be positioned between the first substrate 202 and a second substrate 220. The first and/or second substrate may be made of any appropriate material including, but not limited to printed circuit board, another type of substrate, or combinations thereof.

Figure 4:
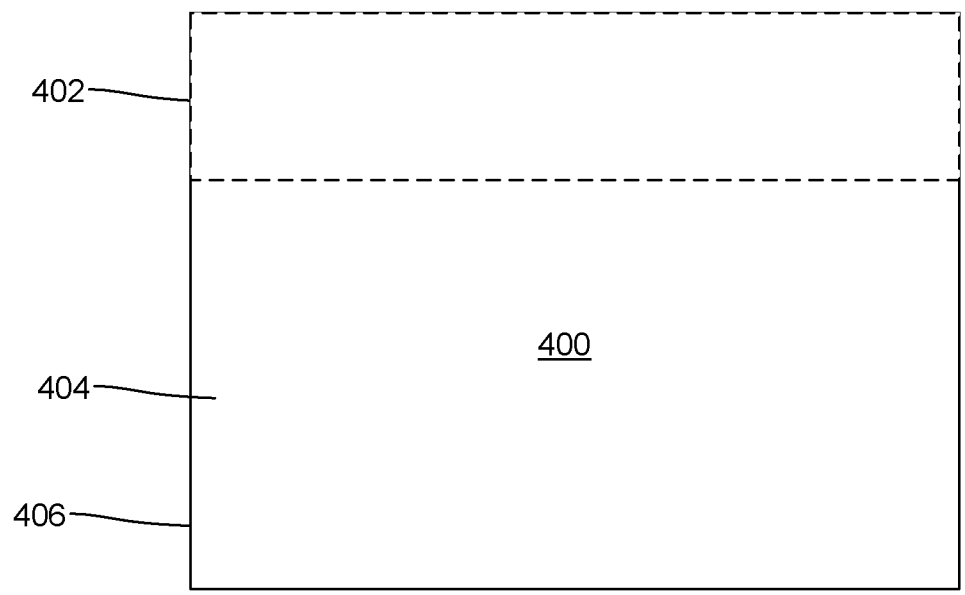
FIG. 4 depicts an example of a track pad with a key area in accordance with the present disclosure.

FIG. 4 depicts an example of a capacitance-based track pad 400. In this example, the track pad has an overlay 404 having a cross sectional thickness 406 with a property that allows for some electric field to pass through and separates the touch surface of the track pad from the sense electrodes. Also depicted in FIG. 4 is an example of a key area 402 shown on the surface of the track pad on the overlay 404. This key area 402 can be activated by a user input in certain embodiments and/or by a set of programmed instructions in other embodiments.

This key area 402 found on the track pad should not be limited to the embodiment shown in FIG. 4. In some embodiments, this key area or key areas may vary in size, shape and uses, as seen in other embodiment such as those depicted in FIGS. 23-26 or other types of embodiments.

Figure 5:
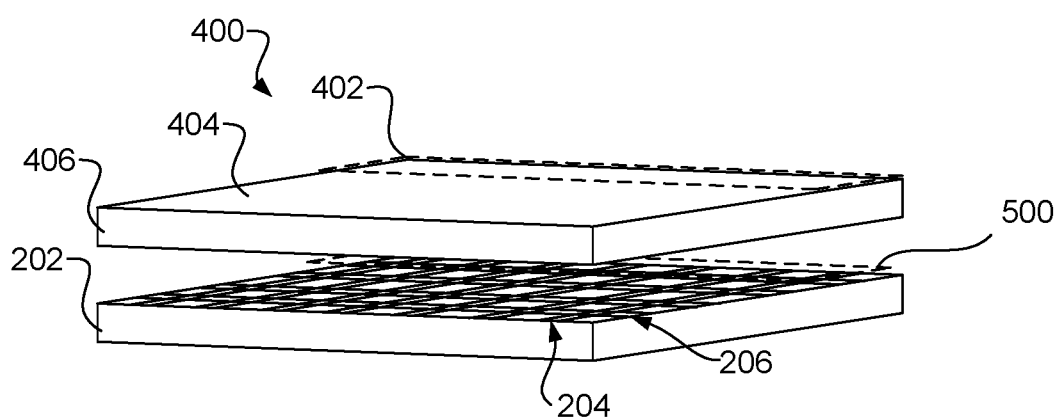
FIG. 5 depicts an example of a key area associated with a multi-use area of a track pad in accordance with the present disclosure.

FIG. 5 depicts an example for a capacitance-based track pad 400. This example depicts a key area 402, an overlay 404, with a thickness 406, shown above electrodes 204 and 206 on substrate 202. A subset of the electrodes 204 and 206 and substrate 202 may be an example of a multi-use region 500 which is depicted below overlap and corresponds to the selectively activated key area 402. This multi-use region 500 may be used to detect user inputs in the key area 402 of the overlay 404. The placement of the multi-use region 500 in this example corresponds with the placement of the key area 402.

Figure 6:
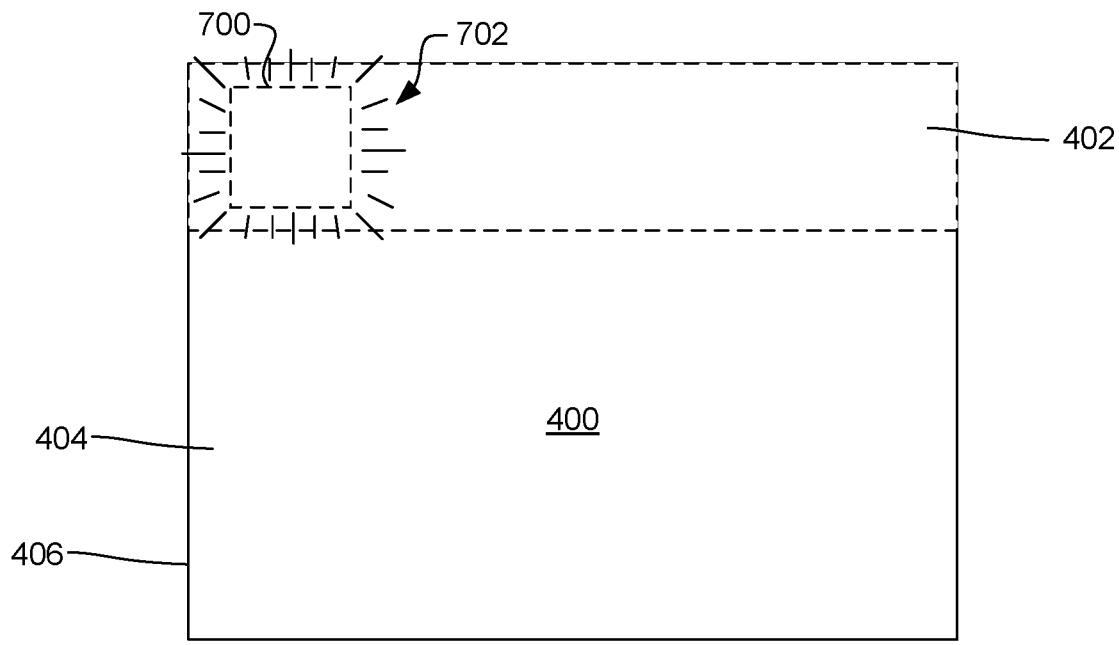
FIG. 6 depicts an example of a track pad overlay that exhibits a characteristic of allowing light to pass through a key area in accordance with the present disclosure.

FIG. 6 depicts an example of a lighting element 702 incorporated into a track pad. The lighting element 702, in some embodiments, may be used to illuminate a key area 700. The overlay may allow for at least some light from the lighting element to pass through the thickness of the overlay to depict the key area 700 on the overlay 404. In some examples, this lighting element 702 may be an LED or another type of lighting element. In some embodiments, the lighting element 702 may illuminate a single key area. However, in other examples, multiple key elements may illuminate multiple, independent key areas.

Figure 7:
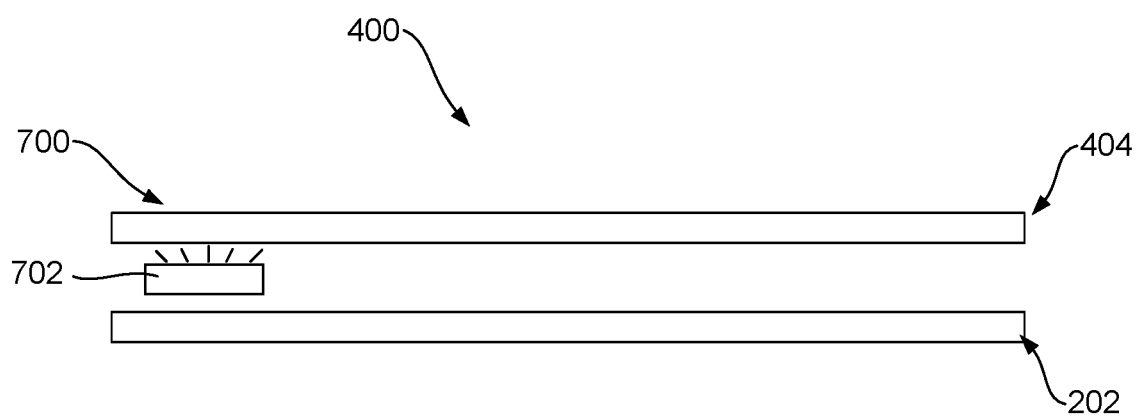
FIG. 7 depicts an example of a light used for illuminating a key area in accordance with the present disclosure.

FIG. 7 depicts an example of lighting element 702 shown between overlay 404 and the substrate 202. In this example, the lighting element 702 is adjacent to the key area. In some examples, at least one lighting element 702 may be incorporated into the substrate, located between the substrate and the overlay, located in a different location, or combinations thereof.

Figure 8:
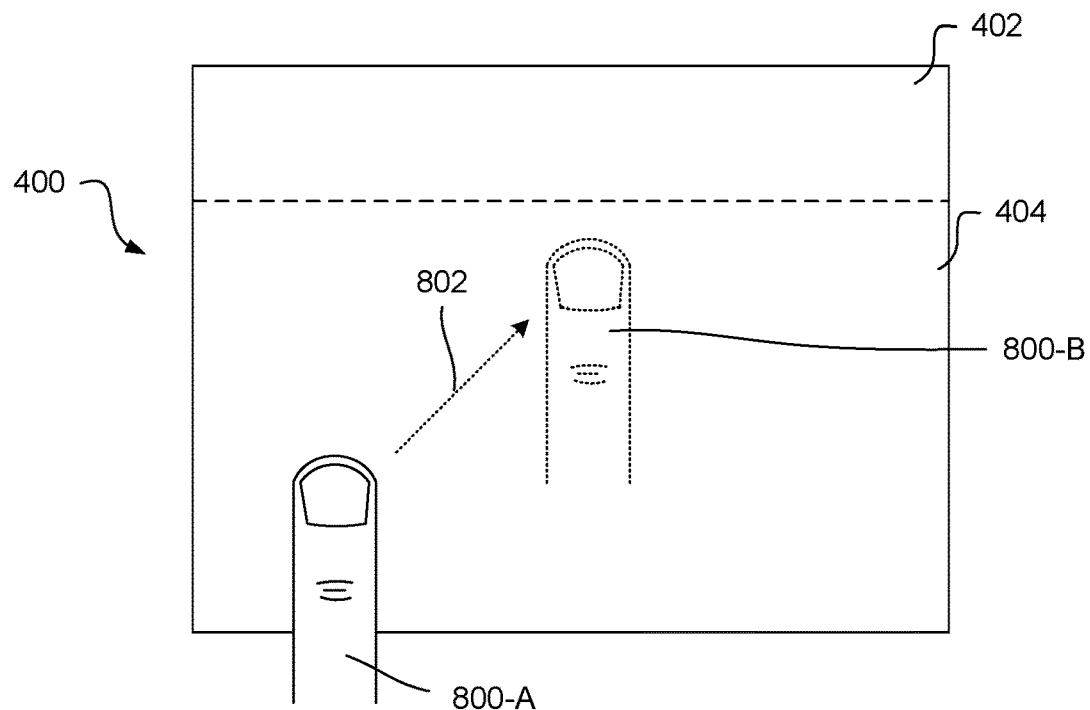
FIG. 8 depicts an example of a slide track gesture in accordance with the present disclosure.

FIG. 8 depicts an example of a track gesture, more specifically a swipe gesture. In this example, a finger 801 starts at a first location 800-A and moves across the surface of overlay 404 towards a second position 800-B.

Figure 9:
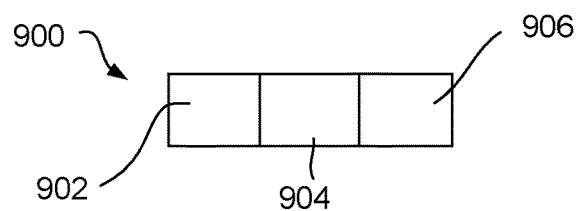
FIG. 9 depicts an example of a raw slide input in accordance with the present disclosure.

FIG. 9 depicts an example of a raw swipe input 900. This raw swipe input 900 may contain multiple bits of information about the swipe track gesture as recorded by the sensor. In this example, a first information bit 902 may represent a time period before the raw swipe input 900 was received, a second information bit 904 may represent a first characteristic of the swipe gesture, and information bit 906 may represent may represent another characteristic of the swipe gesture. For example, the information bits may represent be location coordinates of the finger 801 on the overlay 404, a capacitance value, a time stamp, another type of information, or combinations thereof. The processor may interpret these information bits, process the raw information bits to form a processed input, and send the processed input to the appropriate driver.

Figure 10:
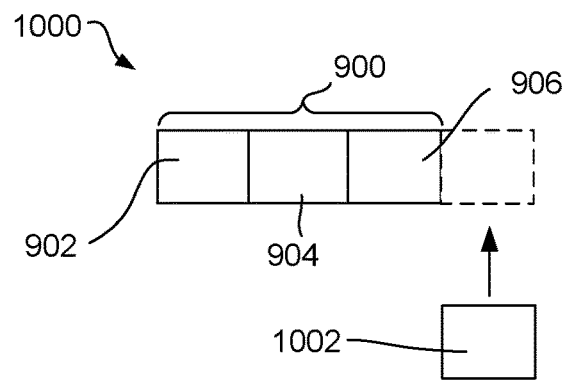
FIG. 10 depicts an example of a processed slide input with an attached confidence indicator in accordance with the present disclosure.

FIG. 10 depicts an example of a processed swipe input 1000. In this example, the processor is inserting information bit 1002 into the string of information that contains the raw information bits of 902, 904, and 906. In this example, information bit 1002 contains a confidence indicator which indicates that the processor has a high level of confidence that the information bits collectively indicate a swipe input. The processor may consider a number of factors in determine the level of confidence that the string of information actually represents a swipe gesture as intended by the user. In response to receiving an inserted information bit, such as the confidence indictor represented by information bit 1002, the string of data may be considered processed data. The processed data may be packaged together in a processed package with other information bits and sent to the appropriate drivers where the drivers will cause the appropriate commands to be executed.

Figure 11:
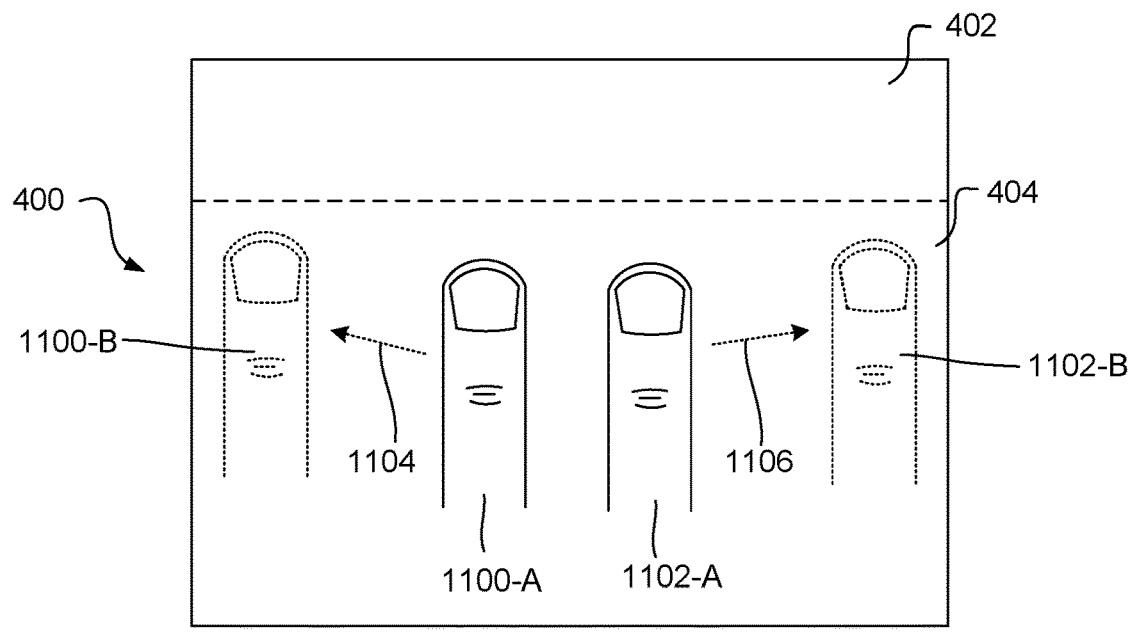
FIG. 11 depicts an example of a scaling track gesture in accordance with the present disclosure.

FIG. 11 depicts an example of a raw scaling input, a type of track gesture. In this example, a first finger 1100-A and a second finger 1102-A move across the surface of the track pad away from one another.

While this example illustrates the two fingers moving away from each other, other examples of a scaling input may depict fingers moving towards each other.

In some cases, the scaling gesture may start outside of the key area 402 or move into the key area 402 while the key mode is active.

Figure 12:
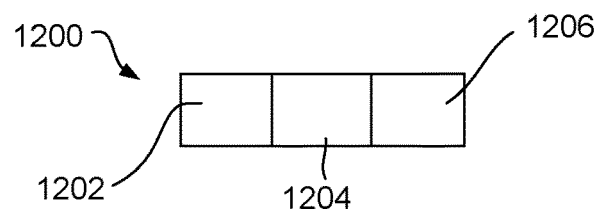
FIG. 12 depicts an example of a raw scale input in the multi-use region in accordance with the present disclosure.

FIG. 12 depicts an example of a raw scaling input 1200. The information bits 1202, 1204, 1206 may include any appropriate type of information that may be used to determine the characteristics of the gesture. For example, the information bits may include the identification of which finger, the location of each finger, a capacitance value, a time stamp, other types of information, or combinations thereof.

Figure 13:
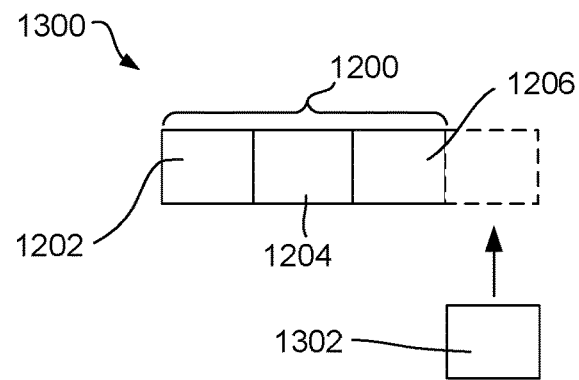
FIG. 13 depicts an example of a processed scale input with an attached confidence indicator in accordance with the present disclosure.

FIG. 13 depicts an example of a processed scaling input 1300. In this example, a confidence indicator may be added to the string of data represented by information bit 1302.

Figure 14:
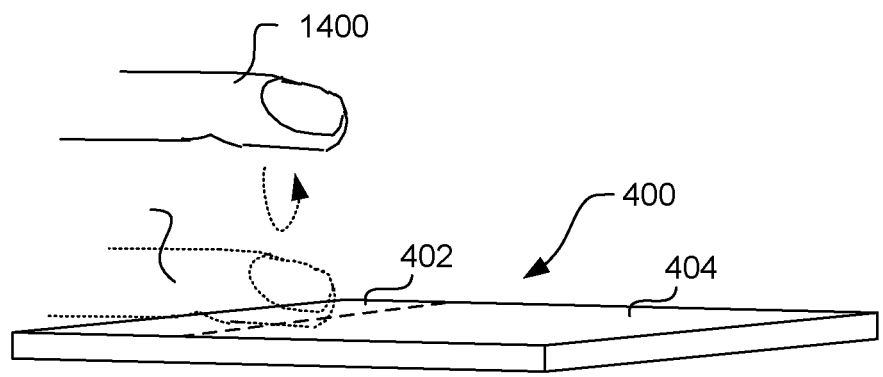
FIG. 14 depicts an example of a tapping gesture in a key area in accordance with the present disclosure.

FIG. 14 depicts an example of a tapping input. In this example, a finger 1400 begins at some distance above the overlay 404. The finger 1400 is then placed on overlay 404 for a brief period of time before being lifted off of the overlay.

In the illustrated example, the tapping gesture is made in key area 402 when the key area 402 is activated. With the tapping gesture being made in the key area when the key mode is activated, both the key driver and the track driver may interpret the information bits as different commands. For example, the track driver may interpret the tapping gesture as a selection of an item on a screen associated with a computer device, as a swiping gesture, or another type of gesture while the key driver may interpret the tapping gestures as a selection of a key. To prevent both drivers from implementing different commands, a non-confidence indicator may be associated with the tapping input. The non-confidence indicator may disable or otherwise instruct the tracking driver not to implement the tapping input. On the other hand, the key driver may be programmed to ignore the non-confidence indicator. In such a situation, just the key driver may implement the commands associated with the tapping gesture.

Figure 15:
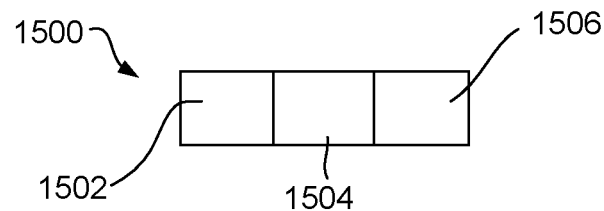
FIG. 15 depicts an example of a raw key input in accordance with the present disclosure.

FIG. 15 depicts an example of a raw tapping input 1500.

The information bits 1502, 1504, 1506 may include any appropriate type of information that may be used to determine the characteristics of the gesture. For example, the information bits may include the identification of which finger, the location of each finger, a capacitance value, a time stamp, other types of information, or combinations thereof.

Figure 16:
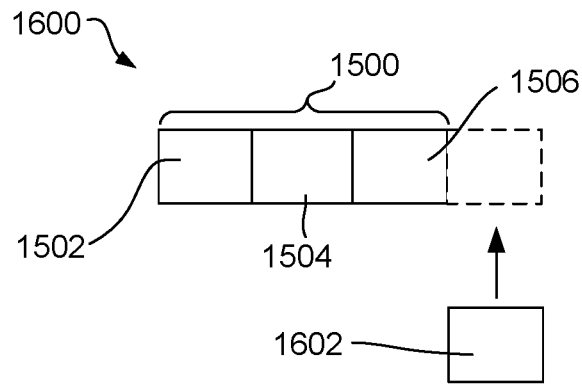
FIG. 16 depicts an example of processed key input in accordance with the present disclosure.

FIG. 16 depicts an example of a processed tapping input 1600. The non-confidence indicator may be inserted into the string of information bits 1502, 1504, 1506 as information bit 1602.

Figure 17:
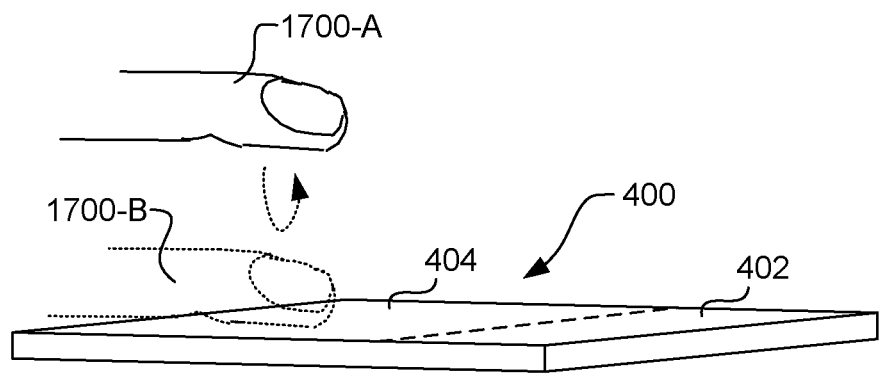
FIG. 17 depicts an example of a tapping gesture outside of a multi-use region in accordance with the present disclosure.

Depicted in FIG. 17 is another example of a tapping input. In this example, a finger 1700 make a tapping gesture outside of the multi-use region. Just those gestures made in the multi-use region have a potential risk of being implemented differently by the track driver and the key driver. Since the tapping gesture depicted in FIG. 17 is performed outside of the multi-use region, the tapping gesture will only be implemented by the track driver, as the key driver does not implement gestures that occur outside of an active key region. Further, if the tapping gesture is executed in the multi-use region while the key mode is off, then only the tracking driver may interpret the gesture's input. In some examples, when the key mode is deactivated, no data is sent to the key driver. In such a situation with no information going to the key driver, the key driver cannot implement gesture leaving only the tracking driver to implement the gestures detected with the track pad.

Figure 18:
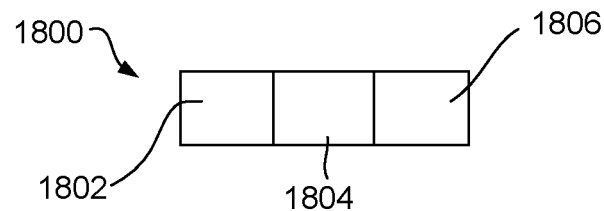
FIG. 18 depicts an example of a raw tapping input in accordance with the present disclosure.

FIG. 18 depicts an example of a tapping input 1800. In this example, the tapping input 1800 contains multiple information bits 1802, 1804, 1806.

Figure 19:
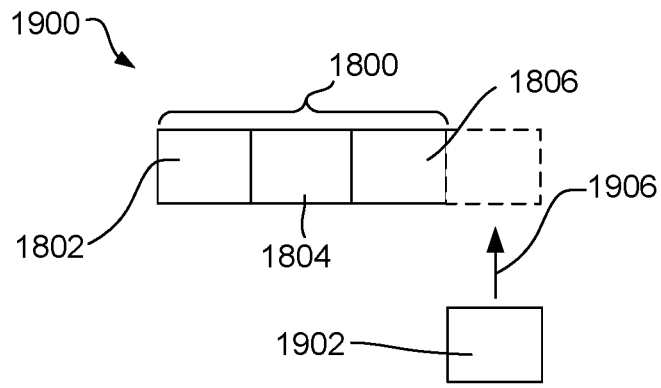
FIG. 19 depicts an example of a processed tapping input in accordance with the present disclosure.

FIG. 19 depicts an example of a processed tapping input 1900. In this example, information bit 1902 is inserted, which contains a confidence indicator, which may indicate the confidence the system has that the gesture was intended to be a gesture input by the user.

The examples above describe the insertion of confidence indicators and non-confidence indictors. Such indicators may communicate to one or more drivers that confidence that the system has a particular interpretation of a gesture. In some cases, a confidence indicator may be read by the track driver and/or the key driver to confirm that a set of information should be interpreted as a certain gesture. The non-confidence indicator may be used by the system to instruct the track driver and/or key driver not to implement a particular gesture notwithstanding that the information bits may suggest that such a gesture was intended. In some cases, the non-confidence indicator may be read, understood, and/or followed by just one of the track driver or the key driver. In such a situation, the non-confidence indicator may selectively prevent just one of the drivers from implementing a particular gesture while allowing the other driver to implement the gesture. This may be advantageous when one of the drivers may interpret the same set of information to be different types of commands, such as a tapping gesture in the multi-use region which has the potential of being interpreted as a different type of tracking gesture to the track driver. While the examples above describe that a confidence indicator is inserted in those circumstances where there is sufficient confidence in a particular gesture, in some examples, confidence indicators may not be inserted when there is sufficient confidence in a particular gesture.

Figure 20:
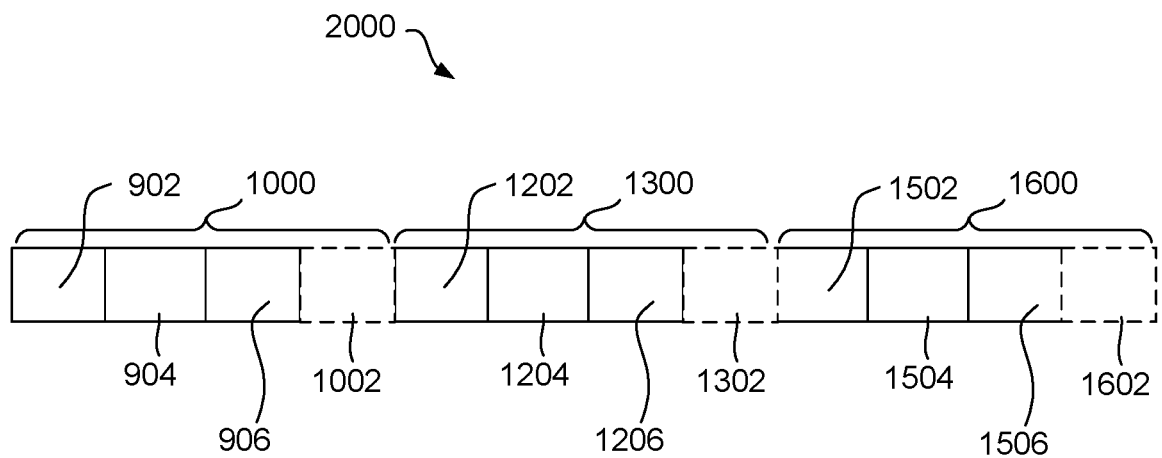
FIG. 20 depicts an example of a processed package in accordance with the present disclosure.

FIG. 20 depicts an example of a processed package 2000. This example of a processed package contains individual processed inputs 1000, 1300, and 1600. This processed package 2000 is processed by a processor and then sent to one or more drivers to implement the gesture inputs.

Figure 21:
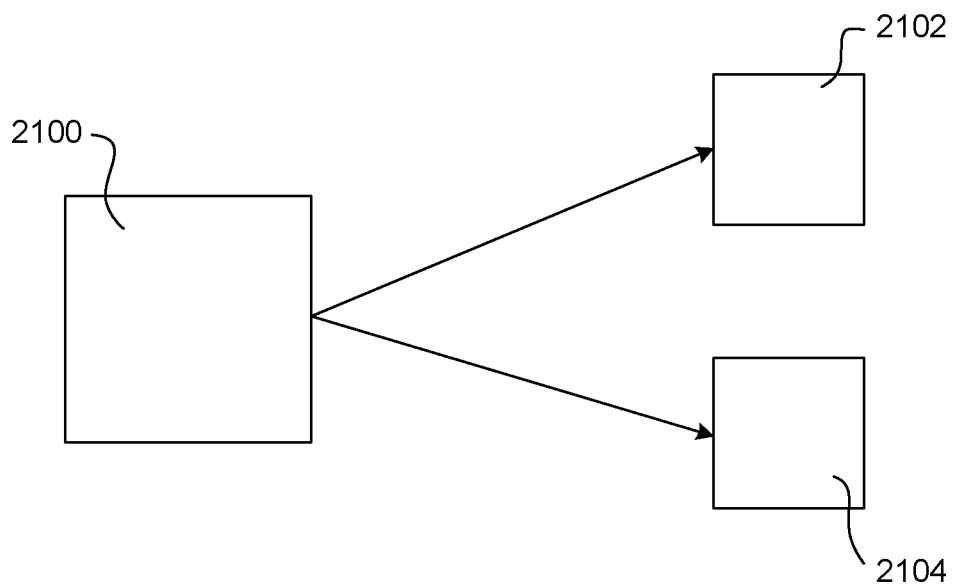
FIG. 21 depicts an example of a processor in communication with a track driver and key driver in accordance with the present disclosure.

FIG. 21 depicts an example of a processor 2100 in communication with a track driver 2102 and a key driver 2104. The processor may send a processed package to both the track driver 2102 and the key driver 2104. Each driver 2102 and 2104 implement the gesture inputs in the processed package 2000.

Figure 22:
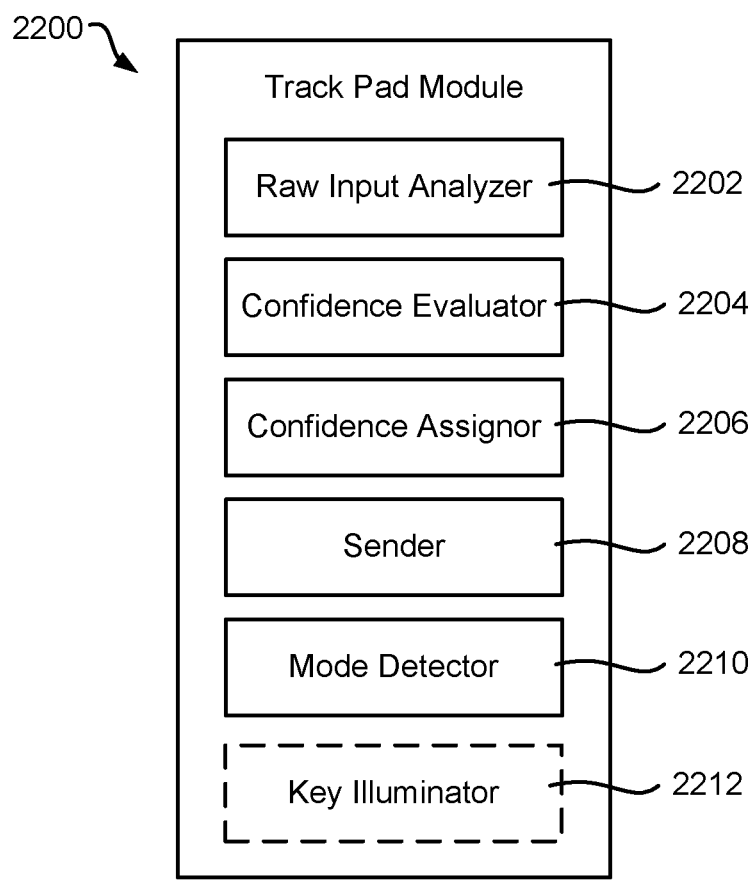
FIG. 22 depicts an example of a track pad module in accordance with the present disclosure.

FIG. 22 depicts an example of a track pad module 2200. In this example, the track pad module 2200 includes programmed instructions in memory and may include associated firmware, logic, processing resources, memory resources, power sources, hardware, or other types of hardware to carry out the tasks of the track pad module 2200. In this example, the track pad module 2200 includes a raw input analyzer 2202, a confidence evaluator 2204, a confidence assignor 2206, a sender 2208, and a mode detector, 2210. In some examples, the track pad module 2200 may also include a key illuminator 2212.

The raw input analyzer 2202 may identify the raw track inputs or raw key inputs made by a user and measured by the track pad 400. The inputs may be analyzed by identifying where on a track pad a change in capacitance occurs. The raw input analyzer 2202 may match recorded data with similar recorded data that is known to be associated with specific gestures. In some cases, if a stored pattern matches with the recorded data, the raw input analyzer 2202 may classify the inputs as the gesture associated with the stored pattern.

The confidence evaluator 2204 may determine whether a non-confidence indicator should be attached assigned gesture. Some of the criteria that the confidence evaluator 2204 may use to determine whether to attach a non-confidence indicator is whether the key mode is on, whether the gesture occur in the key mode, other factors, or combinations thereof.

The confidence assignor 2206 may cause a non-confidence indicator to be associated with the classified gesture based on the determination of the confidence evaluator.

The sender 2208 may send the processed package to the track driver and/or key driver.

The mode detector 2210 may be used to determine whether the multi-use region was activated during the time of the raw input was made. The mode detector 2210 tells the confidence assignor whether the key mode was on or off when the gesture was made. With this information, the confidence evaluator 2204 may more accurately determine whether to associate a non-confidence indicator with the gesture. In some cases, the gesture may be performed outside of the multi-use area. In such a situation, the confidence evaluator 2204 may not consult with the mode detector 2210. In other examples, the mode detector 2210 may provide this information to the confidence evaluator 2204 whether the gesture occurred within the multi-use area or not.

Optionally, in some examples, a key illuminator 2212 may be incorporated into the track pad module. The key illuminator 2212 used to illuminate a lighting element in the multi-use region when the key mode is activated.

Figure 23:
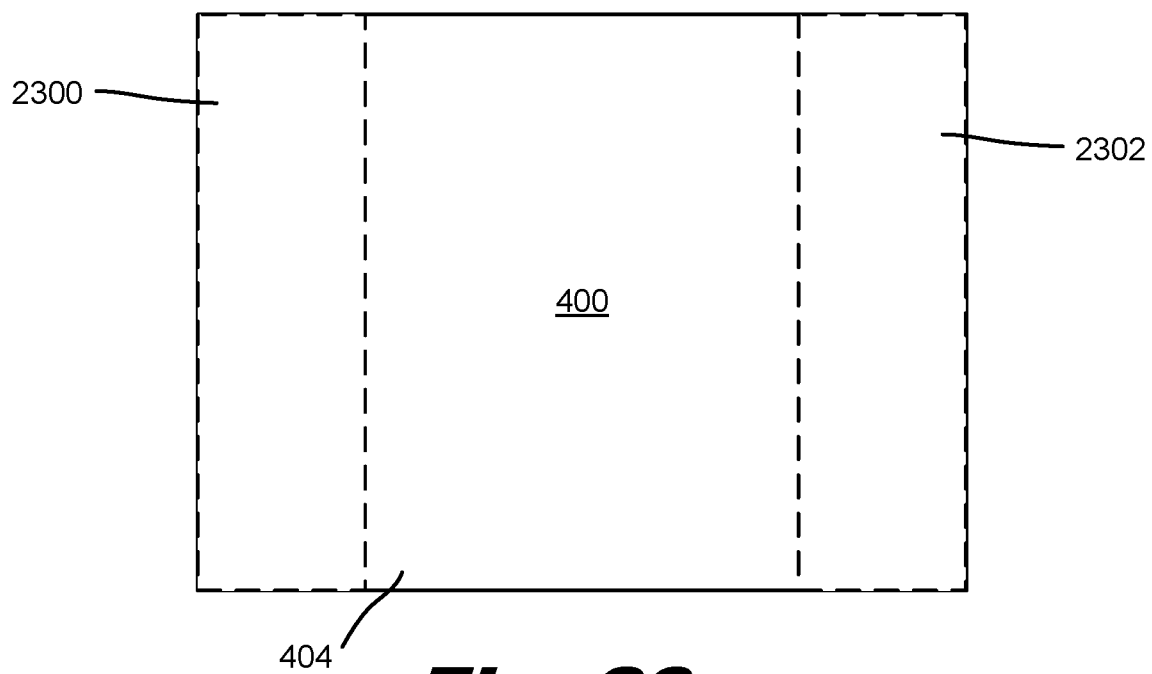
FIG. 23 depicts an example of a track pad with multiple key areas in accordance with the present disclosure.
Figure 24:
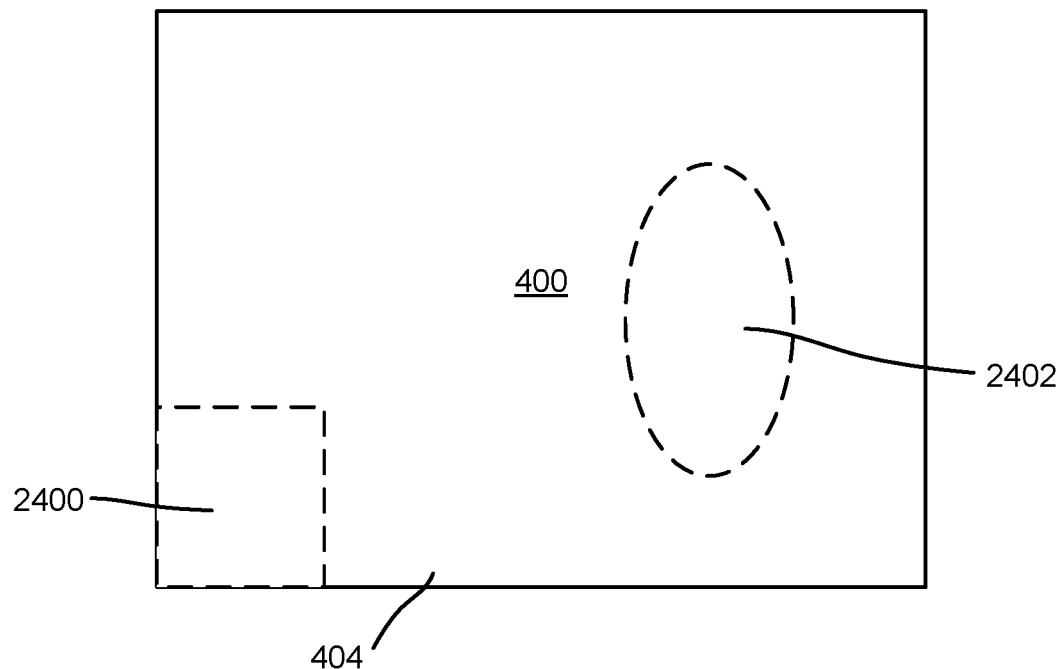
FIG. 24 depicts an example of a track pad in accordance with the present disclosure.

FIGS. 23 and 24 depict alterative embodiments of a track pad 400. In FIG. 23, key areas 2300 and 2302 are located on each of the sides of the overlay 404. FIG. 24 depicts key area 2400 in a portion of the overlay that is away from the edges of the overlay. Key area 2402 is located in a corner of the overlay. While the examples in this disclosure depict the key areas is specific locations, in other examples, the key areas may be depicted in any appropriate location on the overlay.

Figure 25:
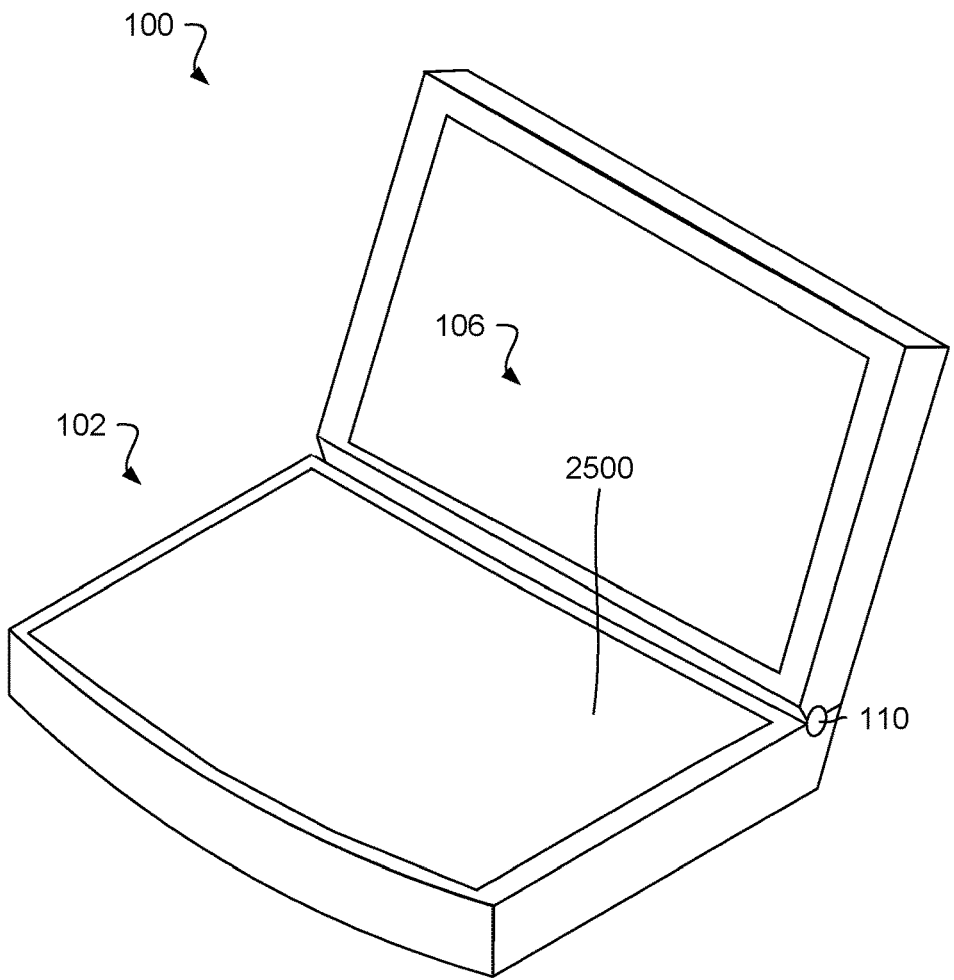
FIG. 25 depicts an example of an electronic device in accordance with the present disclosure.

FIG. 25. depicts an example of an electronic device 100 that includes track pad 2500. Track pad 2500 may replace the keyboard. In some examples, the key areas may represent alphanumeric symbols that would otherwise be displayed on keys of a keyboard.

Figure 26:
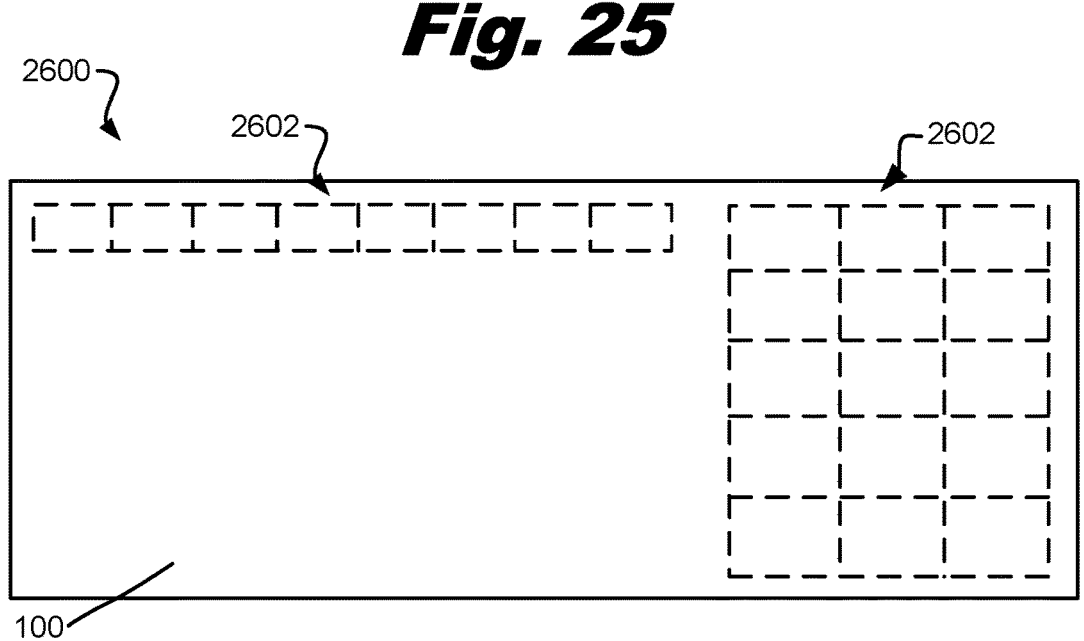
FIG. 26 depicts an example of a track pad in accordance with the present disclosure.

The embodiment in FIG. 26 depicts an example of a track pad 2600 with key areas 2602 and 2604 that may be used for function keys 2602 and a ten key arrangement 2604. These keys may be located in multi-use regions and turned on and off selectively. In some cases, all of the multi-use areas are activated at the same time when the key mode is activated. In other examples, just a portion of the key areas are activated when the key mode is activated. The user may have the flexibility to selectively activate just certain key areas or certain multi-use areas at a time.

Figure 27:
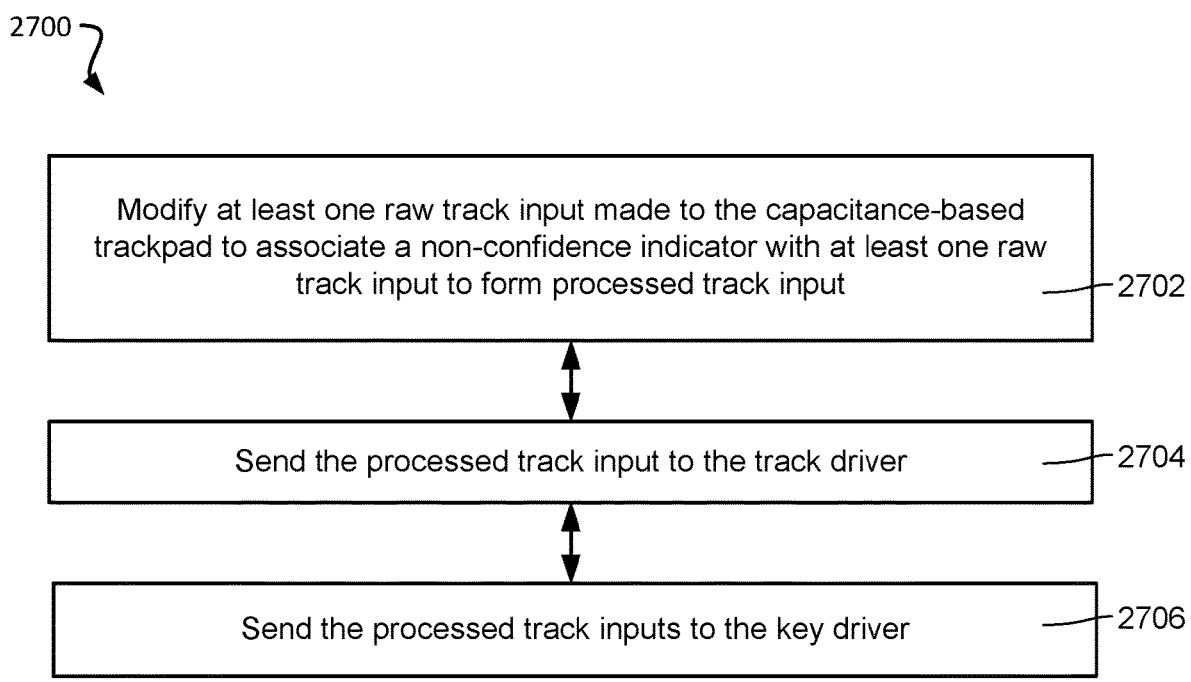
FIG. 27 depicts an example of a method of simultaneous use of a track pad in accordance with the present disclosure.

FIG. 27 depicts an example of a method 2700 of simultaneous use of a track pad. This method 2700 may be performed based on the description of the devices, modules, and principles described in relation to FIGS. 1-26. This method 2700 may include modifying 2702 at least one raw track input made to the capacitance-based trackpad to associate a non-confidence indicator with at least one raw track input to form a processed track inputs, sending 2704 the processed track input to the track driver, and sending 2706 the processed track inputs to the key driver.

Figure 28:
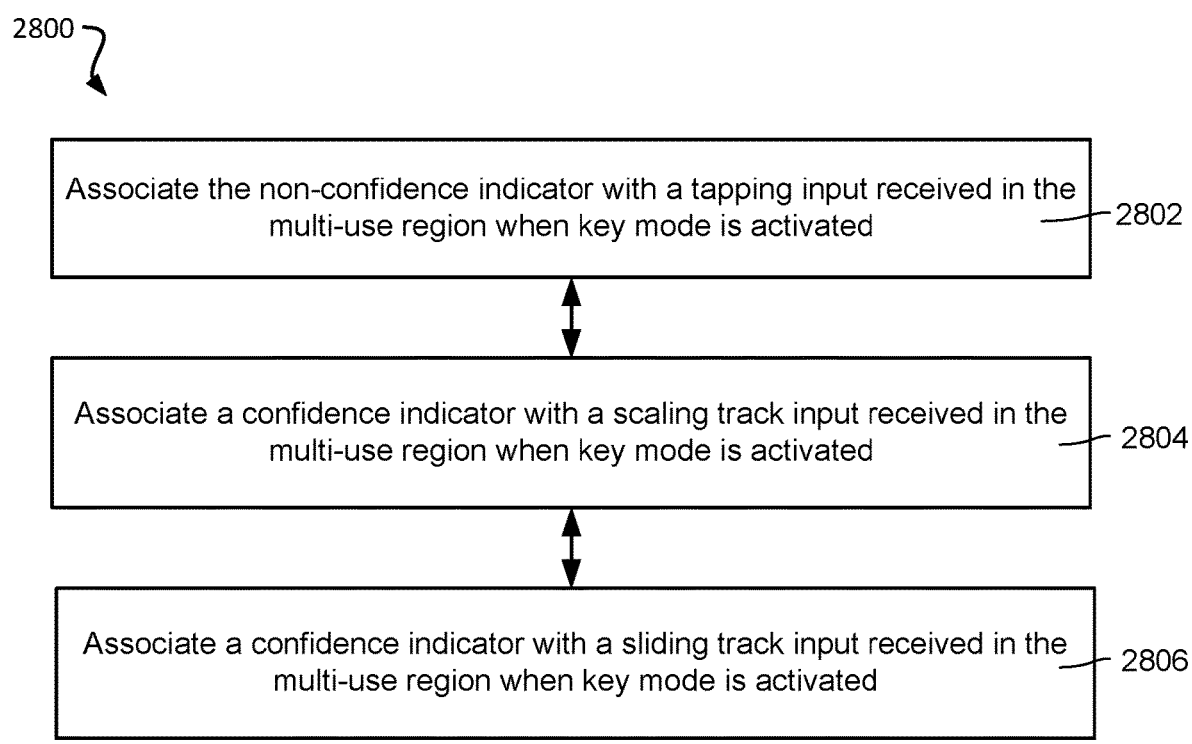
FIG. 28 depicts an example of a method of simultaneous use of a track pad in accordance with the present disclosure.

FIG. 28 depicts an example of a method 2800 of simultaneous use of a track pad. This method 2800 may be performed based on the description of the devices, modules, and principles described in relation to FIGS. 1-26. This method 2800 may include associating 2802 the non-confidence indicator with tapping inputs received in the multi-use region when key mode is activated, associating 2804 a confidence indicator with a scaling track input received in the multi-use region when key mode is activated, and associating 2806 a confidence indicator with a sliding track input received in the multi-use region when key mode is activated.

Figure 29:
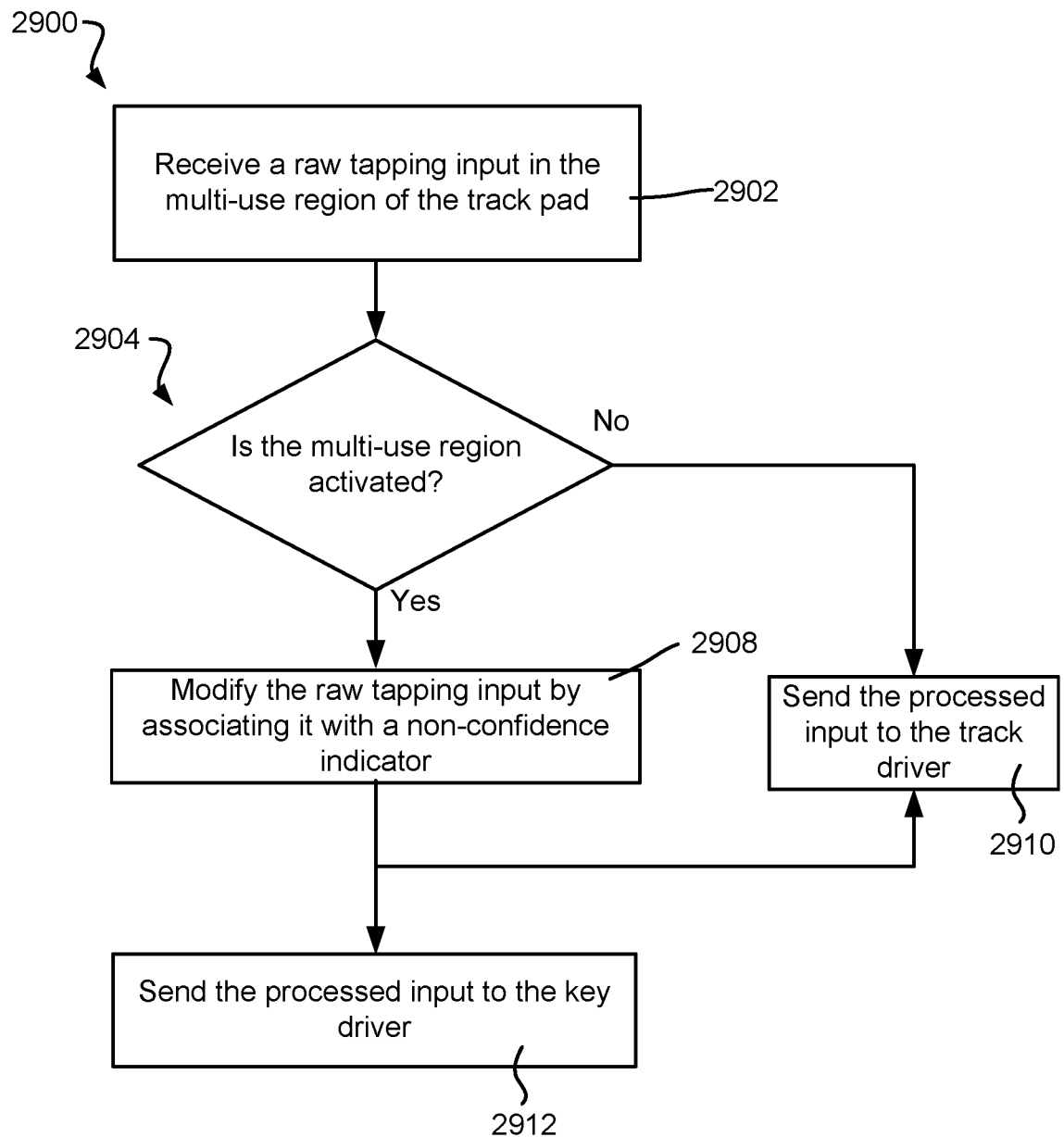
FIG. 29 depicts an example of a method of simultaneous use of a track pad in accordance with the present disclosure.

FIG. 29 depicts an example of a method 2900 of simultaneous use of a track pad. This method 2900 may be performed based on the description of the devices, modules, and principles described in relation to FIGS. 1-28. This method 2900 may include receiving 2900 a raw tapping input in the multi-use region of the track pad and determining 2902 whether the multi-use region is activated. If the multi-use region is not activated, then the method 2900 includes sending 2910 the processed data to the track driver.

If the multi-use region is activated, then the method 2900 includes modifying 2908 of the raw tapping input by associating it with a non-confidence indicator. The method 2900 also includes sending 2910 the processed input to the track driver and sending 2912 the processed input to the key driver.

In some cases, the non-confidence indicator may cause the track driver to not implement the tapping input. This may be an advantage in those situations where a tapping input may appear to be a tracking input from the tracking driver's perspective rather than the key input the user intended. Thus, the tracking driver may not implement a tracking input while the key driver implements a tapping input. In some cases, the key driver may be set up to ignore the non-confidence indicator. In such a situation, the key driver may implement the key input. Thus, in this example, just the tapping input is implemented by the tracking driver rather than the key driver and the tracking driver both applying different outputs for the same input.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. An apparatus, comprising:
a capacitance-based trackpad;
a tracking driver in communication with the capacitance-based trackpad;
wherein the tracking driver is configured to receive raw track inputs from the capacitive-based trackpad;
a key driver in communication with the capacitance-based trackpad;
wherein the key driver is configured to receive raw key inputs from the capacitance-based trackpad;
a processor;
memory comprising programmed instructions, when executed, cause the processor to:
modify the raw track inputs to associate a non-confidence indicator with at least one raw track input from the track inputs to form processed track inputs;
send the processed track inputs to the tracking driver; and
send the processed track inputs to the key driver;
wherein the non-confidence indicator is a piece of information inserted into the processed track inputs that instructs the tracking driver to not interpret or to disable the at least one track input.

2. The apparatus of claim 1, wherein the capacitance-based track pad includes a multi-use region that is selectively configured to operate in a track specific mode and selectively configured to operate, when activated, in a key mode, and when the key mode is activated, the multi-use region is configured to receive raw track inputs and raw key inputs from a user.

3. The apparatus of claim 2, wherein the capacitance-based trackpad has an overlay, wherein the overlay exhibits a characteristic that allows for at least some electric field to pass through a thickness of the overlay.

4. The apparatus of claim 3, wherein the overlay includes a key area associated with the multi-use region that exhibits a characteristic of allowing light to pass through the key area to illuminate the key area when the key mode is activated.

5. The apparatus of claim 2, wherein the programmed instructions, when executed, cause the processor to:
selectively activate the key mode based off of a receipt of a command.

6. The apparatus of claim 5, wherein the command is from a programmed application interacting with the apparatus.

7. The apparatus of claim 2, wherein the programmed instructions cause the processor, when executed, to package the raw track inputs and the raw key inputs as a processed package with the non-confidence indicators when the key mode is activated.

8. The apparatus of claim 7, wherein sending the raw track inputs and the raw key inputs to the tracking driver includes sending the processed package to the tracking driver when the key mode is activated.

9. The apparatus of claim 7, wherein sending the raw track inputs and the raw key inputs to the tracking driver includes sending the processed package to the key driver when the key mode is activated.

10. The apparatus of claim 2, wherein the programmed instructions, when executed, cause the processor to:
simultaneously operate the track mode in the multi-use region when the key mode is activated.

11. The apparatus of claim 2, wherein modifying the raw track inputs to associate a non-confidence indicator with at least one raw track input includes associating the non-confidence indicator with tapping track inputs received in the multi-use region when key mode is activated.

12. The apparatus of claim 2, wherein the programmed instructions, when executed, cause the processor to associate a confidence indicator with scaling track inputs received in the multi-use region when key mode is activated.

13. The apparatus of claim 2, wherein the programmed instructions, when executed, cause the processor to associate a confidence indicator with sliding track inputs received in the multi-use region when key mode is activated.

14. A method of using a capacitance-based track pad, comprising:
modifying at least one raw track input made to the capacitance-based trackpad to associate a non-confidence indicator with the at least one raw track input form processed track inputs;
sending the processed track inputs to the track driver; and
sending the processed track inputs to the key driver;
wherein the non-confidence indicator is a piece of information inserted into the processed track inputs that instructs the tracking driver to not interpret or to disable the at least one track input.

15. The method of claim 14, wherein the capacitance-based track pad includes a multi-use region that is selectively configured to operate in a track specific mode and selectively configured to operate, when activated, in a key mode, and when the key mode is activated, the multi-use region is configured to receive raw track inputs and raw key inputs from a user.

16. The method of claim 14, wherein modifying at least one raw track input made to the capacitance-based trackpad to associate a non-confidence indicator with the at least one raw track input includes associating the non-confidence indicator with tapping track raw inputs received in the multi-use region when key mode is activated.

17. The method of claim 14, wherein modifying at least one raw track input made to the capacitance-based trackpad includes associating a confidence indicator with scaling track inputs received in the multi-use region when key mode is activated.

18. The method of claim 14, wherein modifying at least one raw track input made to the capacitance-based trackpad includes associating a confidence indicator with sliding track inputs received in the multi-use region when key mode is activated.

19. A computer-program product for using a capacitance sensor, the computer-program product comprising a non-transitory computer-readable medium storing instructions executable by a processor to:
modify at least one raw track input made to the capacitance-based trackpad to associate a non-confidence indicator with the at least one raw track input to form processed track inputs;
send the processed track inputs to the track driver; and
send the processed track inputs to the key driver;
wherein the non-confidence indicator is a piece of information inserted into the processed track inputs that instructs the tracking driver to not interpret or to disable the at least one track input.

20. The computer-program product of claim 19, wherein the programmed instructions, when executed, cause the processor to:
associate the non-confidence indicator with tapping track inputs received in the multi-use region when key mode is activated;
associate a confidence indicator with scaling track inputs received in the multi-use region when key mode is activated; and
associate a confidence indicator with sliding track inputs received in the multi-use region when key mode is activated.

* * * * *